F. R. PROCUNIER.
COMBINED AUTOMOBILE BUMPER AND LOCK.
APPLICATION FILED JULY 3, 1916.
1,245,124.
Patented Oct. 30, 1917.
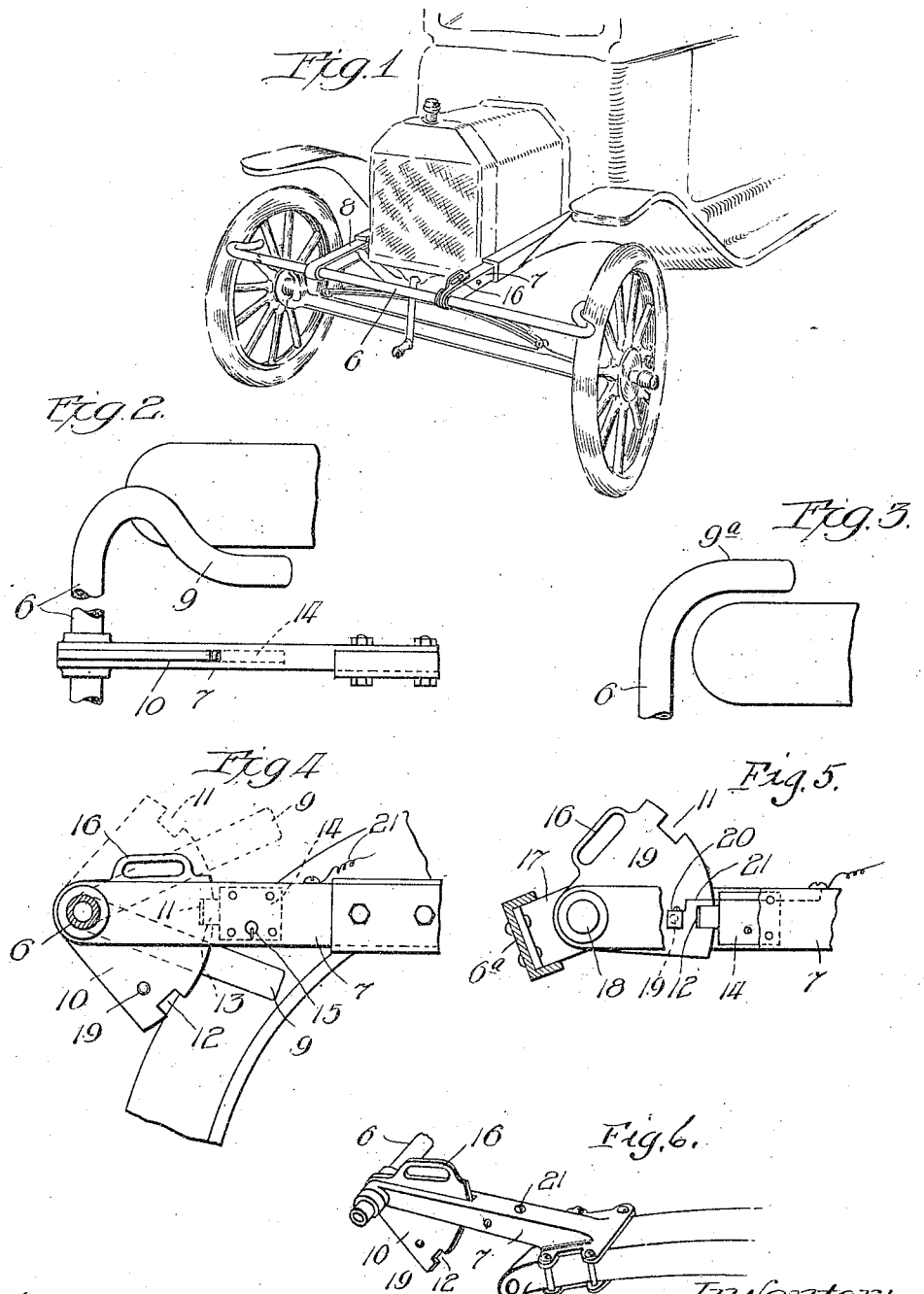

UNITED STATES PATENT OFFICE.

FRANK R. PROCUNIER, OF CHICAGO, ILLINOIS, ASSIGNOR OF THREE-FOURTHS TO WILLIAM M. COLLINS, OF CHICAGO, ILLINOIS.

COMBINED AUTOMOBILE BUMPER AND LOCK.

1,245,124.    Specification of Letters Patent.    Patented Oct. 30, 1917.

Application filed July 3, 1916. Serial No. 107,441.

*To all whom it may concern:*

Be it known that I, FRANK R. PROCUNIER, a Canadian subject of the King of England, residing in Chicago, county of Cook, and State of Illinois, have invented certain new and useful Improvements in Combined Automobile Bumpers and Locks, of which the following is a specification.

The present invention relates to an automobile bumper so designed and mounted that it may be readily adjusted, when desired, to bring its ends into position to prevent the swiveling or turning of the front or steering wheels, thereby effectually locking the machine against unauthorized removal. At the same time, the bumper is so designed that it will be practically indistinguishable in appearance from bumpers of the ordinary type. The locking features of the present invention are extremely simple in construction and formation, and at the same time afford sufficient rigidity of construction to prevent successful tampering with, or breaking of, the lock. The invention consists of the features of construction and the combinations of parts hereinafter described and claimed.

In the drawing:

Figure 1 is a perspective view of the front of an automobile showing the bumper in locking position;

Fig. 2 is an enlarged detail in plan showing the relation of the end of the bumper to one of the automobile wheels;

Fig. 3 is a view showing a slightly modified form of the bumper end;

Fig. 4 is a detail of the lock and associated parts;

Fig. 5 is a modification of the mounting for the bumper; and

Fig. 6 is a perspective detail showing a slightly different method of securing the bumper to the automobile.

The bumper comprises a rod or bar 6, which may be of cylindrical tubular formation, as shown in Figs. 1 to 4, or of channeled formation, as shown in Fig. 5, or of any other formation which may be deemed desirable. The bumper extends across the front of the automobile in the usual manner and is journaled at intermediate points within a pair of forwardly extending bracket arms 7 and 8, which are secured to, and outwardly project from, a suitable or convenient portion of the automobile structure, being supported, as shown in Fig. 1, upon the stringers which support the automobile body, or being supported as in Fig. 6 from the forward springs or frames. In respect to the method of attaching these supporting brackets, the present invention follows the customary practice in vogue in the mounting of bumpers of the ordinary type.

The bumper bar extends laterally on each side to a point in front of the steering wheels of the automobile and from this point the locking ends 9 of the bar are inwardly and rearwardly bent or turned, as shown in Fig. 2, to the degree necessary to bring the ends inside of the wheels when standing normal and in position to interpose the locking ends into the path of swiveling movement of the wheels, so that with the parts in this position, steering of the machine will be impossible. If desired, the locking ends can be given a proper curvature to actually bear upon the tire surface and thus serve to brake the wheels, as well as to prevent their swiveling movement.

Furthermore, if desired, the bar can be bent or configured, as shown in Fig. 3, to afford locking ends 9ª which embrace the wheels from the outside instead of on the inside without changing the mode of operation to any material extent.

In order to hold the parts in adjusted position, a locking and adjusting mechanism is provided, which comprises a segment 10 keyed or pinned to the bumper and fitted to turn within a slot or recess 11 formed in the end of the bracket 7, which segment is provided in its inner curved edge with upper and lower notches 11 and 12, respectively, either of which is adapted to be engaged by the bolt 13 of a lock 14, which is housed within the bracket arm 7 and is operable through a key slot 15 in one side of the bracket. In order to facilitate adjustment of the bumper, a handle 16 is provided on the upper edge of the segment, which facilitates the turning of the bumper into either position of adjustment.

Fig. 5 shows a slight modification in arrangement, in that the bumper 6ª is of channeled formation and is carried by a forward projection 17 formed on the segment, which latter is pivoted to the bracket 7 by means of pivot bearings 18 which are not required in the form first described, in which the bumper bar itself is directly journaled through the supporting brackets. The form shown in Fig. 5 is particularly adapted for use in the mounting of bumpers of angular formation in cross-section and in cases where difficulty might be experienced in mounting the parts in the manner first described.

Furthermore, if desired, electrical contacts 19, as shown in Figs. 4 and 5, in the form of knobs or projections, may be positioned on the sides of the locking segment at a point to engage with a switch 20 located within the slotted end of the bracket, which switch connects with the circuit wire 21 in circuit with the magneto, battery or other electrical sparking device, being so wired that the circuit to the spark plug will be broken when the bumper bar is turned to locking position, and closed when the bar is turned to normal position. Other modifications in the form and structure of the parts may be employed without departing from the spirit of the invention.

In use, when the segment is turned down, as in Fig. 4, the locking ends of the bumper will be thrown into position to prevent swiveling and steering of the front wheels, and in cases where the contact features are employed, the operation of the engine will be stopped so that it will be impossible to operate the machine. It may be deemed desirable to employ the contact features in order to render the device fool-proof and prevent a forward starting of the machine with the bumper bar in position to prevent steering, although this feature may be omitted or thrown out of commission in cases where it is deemed desirable to continue the operation of the engine with the automobile at rest. The arrangement is one which can be readily and quickly adjusted to the desired positions and the structure is of such a simple nature that it can be applied with equal facility in all cases where bumpers of the ordinary type are employed.

I claim:

1. In a device of the class described, supporting brackets suitably secured to the automobile, a bumper bar carried by the brackets and adapted to be turned with respect thereto and having locking ends bent or turned to position to interfere with the operation of the steering wheels when in locking position and to release the wheels when turned to normal position, and means for locking the bumper in either position of adjustment, substantially as described.

2. In a device of the class described, supporting brackets suitably secured to the automobile, a bumper bar carried by the brackets and adapted to be turned with respect thereto and having locking ends bent or turned to position to interfere with the operation of the steering wheels when in locking position, a plate movable with the bumper bar and provided with a pair of notches, and a lock adapted to engage with either of the notches for holding the locking ends of the bumper bar either in normal or locking position, substantially as described.

3. In a device of the class described, supporting brackets suitably secured to the automobile, a bumper bar carried by the brackets and adapted to be turned with respect thereto and having locking ends bent or turned to position to interfere with the operation of the steering wheels when in locking position and to release the wheels when turned to normal position, means for locking the bumper in either position of adjustment, and electrical contact elements adapted to be closed when the parts are in normal position and to be broken when the parts are in locking position for controlling the sparking apparatus of the automobile engine, substantially as described.

4. In a device of the class described, supporting brackets suitably secured to the automobile, a bumper bar carried by the brackets and adapted to be turned with respect thereto and having locking ends bent or turned to position to interfere with the operation of the steering wheels when in locking position, a plate movable with the bumper bar and provided with a pair of notches, a lock adapted to engage with either of the notches for holding the locking ends of the bumper bar either in normal or locked position, and electrical contact elements adapted to be closed when the parts are in normal position and to be broken when the parts are in locking position for controlling the sparking apparatus of the automobile engine, substantially as described.

5. In a device of the class described, the combination of forwardly extending brackets secured to a suitable portion of the automobile, a bumper bar carried by the brackets and provided with inturned locking ends adapted when in locking position to lie laterally of the steering wheels and prevent swiveling thereof and when in normal position to permit the swiveling of the steering wheels, a segment secured to the bumper bar and adapted to be turned therewith and operable within one of the supporting brackets and provided with a pair of notches, and a lock housed within the last mentioned supporting bracket and adapted to engage with either of the notches for locking the bumper bar in adjusted position, substantially as described.

6. In a device of the class described, the combination of forwardly extending brackets secured to a suitable portion of the automobile, a bumper bar carried by the brackets and provided with inturned locking ends adapted when in locking position to lie laterally of the steering wheels and prevent swiveling thereof and when in normal position to permit the swiveling of the steering wheels, a segment secured to the bumper bar and adapted to be turned therewith and operable within one of the supporting brackets and provided with a pair of notches, a lock housed within the last mentioned supporting bracket and adapted to engage with either of the notches for locking the bumper bar in adjusted position, an electrical contact on said segment, a switch within the bracket coöperating with said contact, and circuit wires for controlling the sparking apparatus of the automobile engine, the parts being arranged to open the circuit when the segment is turned to locking position and close the circuit when the segment is turned to normal position, substantially as described.

7. In a device of the class described, the combination of forwardly extending brackets secured to a suitable portion of the automobile, a bumper car carried by the brackets and provided with inturned locking ends adapted when in locking position to lie laterally of the steering wheels and prevent swiveling thereof and when in normal position to permit the swiveling of the steering wheels, a segment secured to the bumper bar and adapted to be turned therewith and operable within one of the supporting brackets and provided with a pair of notches, a lock housed within the last mentioned supporting bracket and adapted to engage with either of the notches for locking the bumper bar in adjusted position, and a handle on the edge of the segment for facilitating adjustment thereof, substantially as described.

8. In a device of the class described, the combination of forwardly extending brackets secured to a suitable portion of the automobile, a bumper bar carried by the brackets and provided with inturned locking ends adapted when in locking position to lie laterally of the steering wheels and prevent swiveling thereof and when in normal position to permit the swiveling of the steering wheels, a segment secured to the bumper bar and adapted to be turned therewith and operable within one of the supporting brackets and provided with a pair of notches, a lock housed within the last mentioned supporting bracket and adapted to engage with either of the notches for locking the bumper bar in adjusted position, an electrical contact on said segment, a switch within the bracket coöperating with said contact, circuit wires for controlling the sparking apparatus of the automobile engine, the parts being arranged to open the circuit when the segment is turned to locking position and close the circuit when the segment is turned to normal position, and a handle on the edge of the segment for facilitating adjustment thereof, substantially as described.

9. The combination of a vehicle having supporting wheels pivoted to be moved about vertical axes, a bumper movably mounted on said vehicle, said bumper having its end portions shaped and arranged to abut against said vehicle wheels and prevent them from being moved pivotally about their vertical axes when said bumper is in one position, and to permit said wheels to be moved about their vertical axes when said bumper is moved to another position, and means for locking said bumper in either of said positions.

10. A device of the class described comprising a pair of supporting arms adapted to be attached to the framework of a vehicle, a bumper bar rotatably mounted on said arms, each end of said bumper bar being shaped so as to abut against the wheels of said vehicle for the purpose set forth when said bumper is in one position, and to be free of said wheels when rotated to another position, and means for locking said bumper bar in said first-mentioned position.

11. A device of the class described comprising a pair of supporting arms adapted to be attached to the framework of a vehicle, a bumper bar rotatably mounted on said arms, each end of said bumper bar being shaped so as to abut against the wheels of said vehicle for the purpose set forth when said bumper is in one position, and to be free of said wheels when rotated to another position, and a lock on one of said supporting arms for securing said bumper bar in said first-mentioned position.

FRANK R. PROCUNIER.

Witnesses:
  STEPHEN G. HOBERT,
  FRANCES M. FROST.